United States Patent [19]
Durschner et al.

[11] 3,931,451
[45] Jan. 6, 1976

[54] APPARATUS FOR PREVENTING BURN-OFF DUE TO AN ACCIDENTICAL STANDING ARC IN HIGH VOLTAGE APPARATUS

[75] Inventors: Rolf Durschner, Mohrendorf; Werner Lehmann, Erlangen, both of Germany

[73] Assignee: Siemens Aktiengesellschaft, Munich, Germany

[22] Filed: Feb. 6, 1974

[21] Appl. No.: 440,050

[30] Foreign Application Priority Data
Feb. 14, 1973  Germany............................ 2307195
Nov. 29, 1973  Germany............................ 2360070

[52] U.S. Cl................ 174/11 R; 174/21 C; 174/28
[51] Int. Cl.²...................... H01B 9/04; H01B 9/06
[58] Field of Search .... 174/11 R, 16 B, 21 C, 22 C, 174/28; 116/114 V

[56] References Cited
UNITED STATES PATENTS

| | | | |
|---|---|---|---|
| 1,924,793 | 8/1933 | Laske............................ | 116/114 V X |
| 3,391,243 | 7/1968 | Whitehead...................... | 174/28 |
| 3,546,356 | 12/1970 | Graybill et al................. | 174/28 X |
| 3,610,807 | 10/1971 | Whitehead...................... | 174/28 X |
| 3,629,486 | 12/1971 | Swampillai et al.............. | 174/28 X |
| 3,766,306 | 10/1973 | Olsen.............................. | 174/28 X |
| 3,767,837 | 10/1973 | Graybill......................... | 174/28 X |
| 3,781,454 | 12/1973 | Olsen.............................. | 174/11 R |
| 3,814,831 | 6/1974 | Olsen.............................. | 174/28 |

*Primary Examiner*—Laramie E. Askin
*Attorney, Agent, or Firm*—Kenyon & Kenyon Reilly Carr & Chapin

[57] ABSTRACT

High voltage apparatus having a voltage carrying part such as a conductor enclosed by a housing with a gas, such as $SF_6$ under pressure, used as insulation in the housing in which, in order to prevent burn-off of the housing and the voltage carrying part in the event of an accidental standing arc, the wall of the housing and, optionally, the voltage carrying part are provided, in the area most likely to be exposed to an accidental standing arc, with a reinforcement against burn-off which includes means to relieve compressed gas pressure and is designed so as to have a heat insulating effect for the wall of the housing.

15 Claims, 6 Drawing Figures

APPARATUS FOR PREVENTING BURN-OFF DUE TO AN ACCIDENTICAL STANDING ARC IN HIGH VOLTAGE APPARATUS

BACKGROUND OF INVENTION

This invention relates to high voltage apparatus in general, and more particularly to an improved construction for high voltage apparatus in which a conductor is enclosed by a housing and uses a gas under pressure as insulation inside the housing.

Apparatus of this general nature is known in which the high voltage apparatus with a voltage carrying part is enclosed by a housing or cladding with the housing supported by insulating members running between it and the voltage carrying part and which contains gas under pressure inside the housing which gas is used as insulation. In such devices, reinforcements are provided in the form of a double wall to prevent burn-off at the portions of the apparatus where standing arcs are expected in the case of trouble. An arrangement of this nature is shown for example, in U.S. Pat. application Ser. No. 201,464, filed Nov. 23, 1971, now U.S. Pat. No. 3,814,831.

High voltage networks are increasingly being equipped with completely housed switching installations which have compressed gas insulation not only at the nodal points, but also include housed tubular conductors having compressed gas insulation as opposed to the more common types of cables. Such is also provided for sections of line which are not constructed as open wire lines. These compressed gas insulated, completely housed tubular conductors are also referred to as compressed gas insulated high voltage tubular cables. At switching stations as well as in tubular conductors, single-and multi-phase housing is customary, which housing must meet certain safety requirements.

In the apparatus of the above mentioned U.S. Pat. application Ser. No. 201,464, filed Nov. 23, 1971, now Pat. No. 3,814, 831 a metal clad high voltage line is described, in which a closed, burn-off resistant ring is provided at the inside wall of the housing, adjacent to the insulating members separating the cable and its housing. At this portion there is thus what could be called an inner or inside wall and an outer or outside wall with the burn-off resistant ring being provided as the inside wall and the normal housing as the outside wall. A ring such as this ensures that an accidental occurring at the metal housing and which is unavoidably urged toward the nearest insulating member along the path of the current as a result of current forces will reach the burn-off resistant ring with its base starting at the housing. It can dwell, at that point, presuming suitable design of the ring, until interruption of the arc, thus, preventing destruction of the metal cladding or housing itself.

Arrangements of this nature are also described in an article by S. Fuhuda entitled "Current Carrying and Short Circuit Tests on EHV Cables Insulated with $SF_6$ Gas" in IEEE Transactions on Power Apparatus Systems, vol. PAS-88 (1969), p. 147 to 153. As described therein, in tubular conductors the burn-off of the housing and the conductor due to accidental arcs is dependent on the material with which the cladding or the conductor is made. For example, an accidental arc will burn through a cladding of aluminum considerably faster than through steel cladding under otherwise equal conditions. This can be an advantage, because the sooner pressure relief occurs after the accident, the less probable is an additional pressure buildup and a major accumulation of hot gases and metal vapor resulting from accidental arcs. However, it is also a decisive disadvantage that aluminum cladding can burn through so easily at any point in that such can occur with short circuit currents of only a few kA, which currents have consequences which are essentially harmless. Thus, the prior art devices do not meet all the safety requirements required in an apparatus of this type.

Thus, it can be seen that there is a need for an improved arrangement of this type which avoids the problems present in the prior art.

SUMMARY OF THE INVENTION

The present invention provides such an apparatus with an arrangement along the lines of those above described with the additional provision that means are provided to relieve the reinforcement of compressed gas pressure and that the reinforcement is arranged so that it has a heat retarding effect on the wall of the housing. Through these measures, the advantage of a reinforcement which is not subject to additional pressure stress during an accidental arc burn is obtained and furthermore the arc temperature is kept from the housing which acts as the pressurized container.

In the disclosed embodiment, the space between the inner and outer wall of the housing, i.e., between the normal housing and the reinforcement ring, is preferably connected with the interior of the housing. This space can also be partially filled with a solid, heat-insulating material. This insures gas pressure relief on the one hand and the desired heat retardation on the other hand, achieving these ends in a particularly advantageous manner.

A further advantageous provision is in providing connections between the space between the inner and outer wall of the housing through the use of breakthroughs in the inner wall with a gas space adjacent to the gas space in which the accidental arc burns occur. That is, the normal insulating members which separate the conductor from the housing form separate chambers within the apparatus which are gas tight from one another. The breakthroughs in the inner wall permit equalizing the pressure between two adjacent chambers, i.e., between fault-containing and unaffected sections of housing, and thus, the insulating members separating the two chambers are not subjected to an additional pressure stress.

In one preferred embodiment, the outer wall of the housing is a sleeve which is attached by slipping it on. Furthermore, the outside of this outer wall can be coated with a paint which permanently indicates a temperature rise of the wall by a change in color. By using such a sleeve, a simple design solution is obtained and furthermore, by applying a suitable paint the occurrence of overheating can be indicated from the outside.

The making of the inner wall of the housing of a material which is more burn-off resistant than the outer wall is preferable. If such is done, the housing may be of aluminum, i.e., the outer wall, and the reinforcement (the inner wall) of steel. Thus, if a reinforcing material having a high melting point and thereby a high burn-off resistance is chosen, the established safety requirements will immediately be met with wall thicknesses which are economically justifiable.

As a further advantageous measure, the voltage carrying part can also be protected against burn-off in the region in which accidental arcs will occur in case of trouble by reinforcement. It is particularly advantageous that the voltage carrying part have as reinforcement in this area, a portion made of a material having a burn-off resistance which is greater than the burn-off resistance of the rest of the material for the voltage carrying part. Another solution for reinforcing the voltage carrying part against the burn-off is through the use of a reinforcement member which is a protective layer of a material having greater burn-off resistance than the material of the voltage carrying part. In one illustrated embodiment, the protective layer is self-supporting and is in part, at least, a distance from the voltage carrying part. Again, it is preferable to make the reinforcement of steel and the voltage carrying part of aluminum.

Another suitable choice of materials is in making the reinforcement of copper and the voltage carrying part of aluminum. A copper tube with an aluminum disc at both of its ends can be made as a structural unit. With this structural unit, a particularly burn-off resistant material on one hand is deployed in the desired area, but the technical problems associated with making a joint between copper and aluminum at the installation site is avoided by the preassembly of this unit in the shop. At the installation site, only a simple aluminum — aluminum joint needs to be made. For such a unit, friction-welded joints are particularly advantageous. In constructing such a joint, an intermediate layer of silver is applied to the end faces of the copper tube, after which the aluminum disc or the copper tube are then set in rotation and pressed on to each other while rotation proceeds. This produces a unit having high electrical conductivity between its portions and which is also mechanically very durable. Fabrication of such a unit by means of a friction welded joint can also be accomplished using aluminum or steel or another more burn-off resistant material.

DETAILED DESCRIPTION OF THE PREFERRED EMBODIMENT

Figure 1:
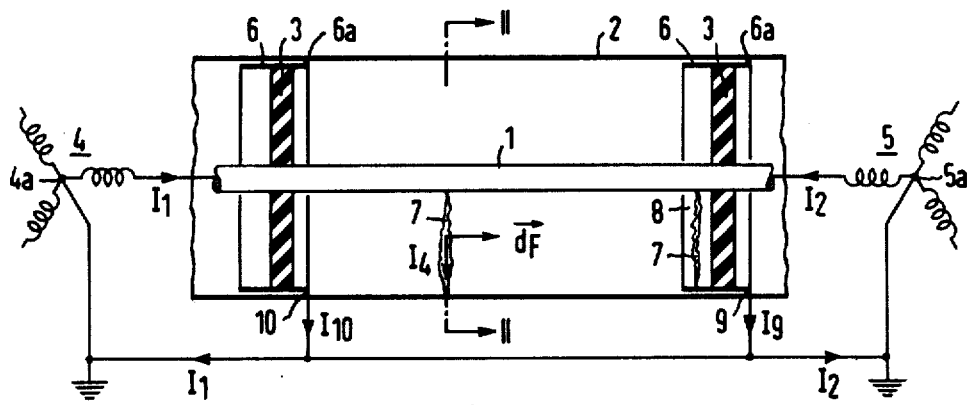
FIG. 1 is a schematic illustration of a tubular conductor according to the present invention showing a longitudinal cross-sectional view thereof.

FIG. 1 illustrates schematically a partial cross-section of a tubular conductor according to the present invention. A conductor 1 is arranged as the voltage carrying part within a tubular housing 2. The conductor is supported within the housing 1 through the use of insulating members 3. As illustrated, the conductor 1 is connected at each end with the respective winding of a three phase transformer 4 or 5, having a grounded neutral. Preferably, the housing and the conductor are both made of aluminum or an aluminum alloy.

In the area of the insulating member 3, the housing 2 is provided with a reinforcement 6, which may be, for example, a cylinder of stainless steel, mechanically connected to the housing 2 and electrically conducting at least at the line 6a. The detailed design of this arrangement will be described below in connection with FIG. 4.

Figure 2:
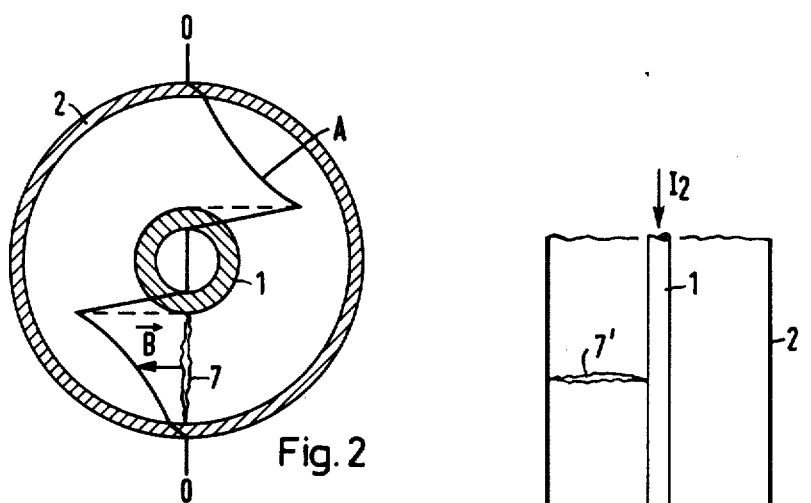
FIG. 2 is a cross section through the tubular conductor of FIG. 1 along the lines II—II.

If in the case of an accident, in which an arc 7 is ignited, a current $I_1$ flows from the input 4 and a current $I_2$ from the input 5 through the conductor 1 into the arc 7, and if the current $I_1$ is larger than the current $I_2$, then the arc 7 will be driven in a very short time by the electromagnetic forces present to the dwelling point 8 in the vicinity of insulator 3, which is nearest to the input 5 with the smaller current $I_2$. Because of the concentric arrangement of the conductor 1 and the housing 2, it does not matter at which of the points 9 or 10 and with what magnitude the currents $I_9$ and $I_{10}$ leave the housing. In the plane of the arc 7, which is shown in cross section in FIG. 2, the magnetic induction $L$ resulting from the conductor currents $I_1$ and $I_2$ exists, which is rotationally symmetrical in space as shown by the curve A in FIG. 2 and to the magnitude and shape of which the currents $I_9$ and $I_{10}$ contribute nothing, since the arrangement is a shielded tubular conductor. The force $dF = I_4 \times dl \times d L$ acting over the length $dl$ of the arc 7, where $I_4$ is the current flowing through the arc 7, thus, always has as its direction that of the larger of the currents $I_1$ or $I_2$. The force $dF$ in the present example thus points to the right, as illustrated on FIG. 1 and will drive the arc to the dwelling point 8, with the insulating member 3 acting as an arc barrier.

Since the dwelling point will be at point 8, in accordance with the present invention, the reinforcement 6 is provided at the inner wall of the housing 1 in such a way that the thermal arc resistance of the housing on the side of the stronger input corresponds to the sum of the short circuit current flowing toward the arc and on the side of the less powerful input to the short curcuit current to be expected there, a burning through of the housing by the arc 7 is prevented.

Figure 3:
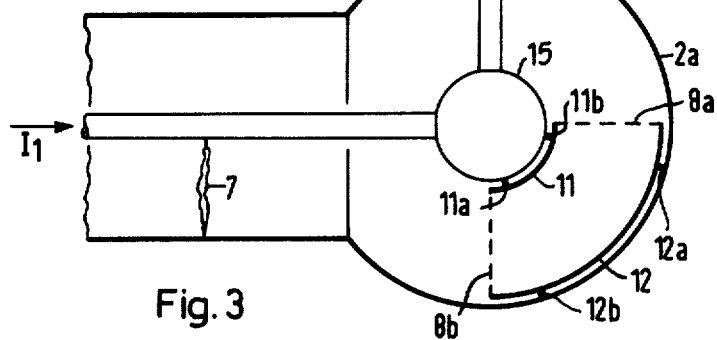
FIG. 3 is a cross sectional schematic representation of a tubular line which has a 9° change in direction.

FIG. 3 illustrates schematically a cross section through a tubular line with a change in direction. At the bend, the housing 2 along with the conductor 1 are both made in a spherical shape. Because of this, the magnetic fields described in connection with FIGS. 1 and 2, will result in an accidental arc 7 fed by the current $I_1$, traveling into the magnetic field free conductor axis in the spherical region 2a with the arc remaining at a dwelling point 8a in this region as a standing arc. In the case of an arc 7' fed by the current $I_2$, the standing position into which it will be driven, will be at point 8b. In the general case of current feeding from both sides, the thermally endangered surfaces of the conductor 1 and housing surfaces are expanded to strips 11 and 12 located between the points 8a and 8b, i.e., the arc may occur anywhere within the sector so defined. Thus, as illustrated on FIG. 3, protective layers 11a and 12a comprising strips of spherical shape, and which will preferably be of steel are provided and are placed on the housing 2a or the sphere 15, or as indicated on FIG. 3, are held in place by electrically conducting spacers 11b and 12b so that they are at a distance from the housing 2a or sphere 15.

Figure 4:
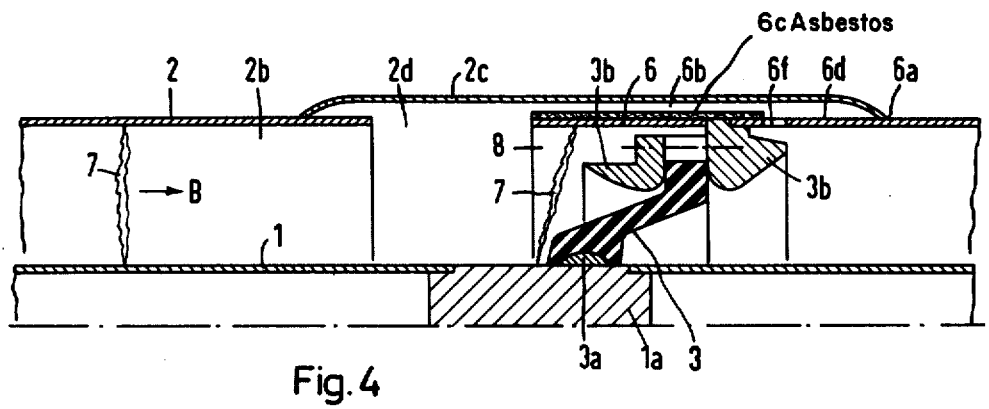
FIG. 4 is a cross-sectional view showing the details of construction according to one embodiment of the present invention.

FIG. 4 illustrates in cross section, half of a straight section of tubular line in the area of the insulating member 3. As ullustrated, a thin-walled hollow conductor 1 is arranged within a thin-walled housing 2. The conductor 1 is supported within the housing 2 by insulating members 3 in an essentially gas tight manner. The arrangement is of rotational symmetry and the interior $2b$ between the conductor 1 and the housing 2 is filled with a gas, such as $SF_6$, under pressure.

The funnel-shaped insulating member is fastened to the conductor 1 using a first ring-shaped grading electrode $3a$ and to the housing 2 using a second ring-shaped grading electrode $3b$. The grading electrodes $3a$ and $3b$ are shaped so that the field strengths occurring at the edges of the insulating body 3 are limited to the permissible values and the electrical properties of the tubular conductor and are not detrimentally affected by fastening elements such as screws. In the vicinity of the insulating member 3, the normally thin-walled hollow conductor 1 is made solid using an intermediate piece $1a$. In the same vicinity, the housing 2 is furthermore double-walled with a connection $2d$ existing between the interior $2b$ of the housing and the space $6b$ between the outer wall $2c$ of the housing and the reinforcing inner wall 6 of the double-walled area of the overall housing 2. The insulating member 3 is in contact with the reinforcing inner wall 6 of the housing 2. The inner wall 6 or reinforcement ring may, for example, be made of steel. The intermediate piece $1a$ of the conductor similarly may consist of steel or of the material of the conductor 1. The other parts of the housing in the thin-walled conductor 1 will normally consist of aluminum. Instead of these materials, others can, of course, be used, which have a higher melting point and greater burn-off resistance than the material of the rest of the housing and the thin-walled conductor 1.

The inner wall 6 providing the reinforcement of the housing 2 and the intermediate piece $1a$ providing reinforcement of the conductor 1 preferably extend beyond the insulating member 3 on both sides with respect to the longitudinal axis of the tubular conductor. As illustrated, the inner wall 6 of the housing can be made so that on the two sides of the insulating member 3, it is made, at least in part, of different materials. The inner wall 6 on the side of the input with the smaller short circuit current can, for example, be made at least partly of aluminum and at most in the region adjacent to the insulating member 3 of steel and on the other side of the insulating member 3, only of steel, i.e., the portion on the other side where the arc 7 will occur should be only of steel.

As explained above, with single-pole housings the dwelling point 8 of the accidental arc 7 is always away from the input with the higher power when an accident occurs, assuming short circuit current flows from both sides. As shown in FIG. 1, this is normally the case. Thus, as illustrated, it is situated immediately ahead of the insulating member 3 which acts as an arc barrier, as viewed from the input with the higher power. As long as the accidental arc is moving in the direction illustrated by the arrow B on FIG. 4, only moderately heated burn tracks are produced on the conductor 1 and housing 2. In addition, a pressure increase is experienced. When the arc finally reaches the dwelling point 8 in the vicinity of member 3 and stays there, the conductor and housing begins to melt to a greater gree. The thinner the wall of the conductor tube and the housing 2, the faster the process proceeds and the sooner undesirable reactions between the conductor material or the housing material and the insulating gas are likely to occur. The results of these reactions would be the destruction of the conductor and the housing and additional increases in the pressure which can lead to a rupture of the housing 2. In the embodiment illustrated on FIG. 4, a short round post $1a$ of the same diameter is welded as an intermediate piece into the thin-walled conductor tube in the region of the insulating member 3. As described, the housing is also made with a double wall in this region with the base of the accidental arc being situated at the inner wall of the housing 2. Since this inner wall 6 consists of a material of higher burn-off resistance, such as steel of sufficient thickness, the danger of burning through and melting during the burning of the arc is eliminated. Furthermore, the intermediate piece $1a$ will melt only partially during the burning time of the accidental arc 7, so that the destruction of the hollow conductor 1 is also prevented.

A further advantageous feature of the embodiment of FIG. 4 is in the construction of the outer wall $2c$ of the housing 2. As illustrated, it is in the form of a sleeve which is slipped on and which is easy to install and repair. The temperature controlling member, i.e., the protective tube 6, maintains the chosen housing diameter and the electrical properties of the tubular line are not affected. On the side $6d$ with the smaller short-circuit power at the inner wall 6, the temperature controlling member is simply a continuation of the normal or slightly reinforced wall of the housing, i.e., the other portion of the inner wall 6 can, for example, be made of aluminum. As shown, this region terminates in the ring-shaped control electrode $3b$, which is at the same time the support member and the contact surface for the protective tube 6 which is highly temperature resistant and hard to burn off and is required on the high power side and which, as noted above, can be made of alloy steel. In addition, there is provided only one metallic thermal bridge $6a$ for retaining pressure with this bridge being located on the low-power side at an appropriate distance from the base area where an accidental standing arc 7 might occur. In the other areas, the heat transfer is kept so small through the size of the gas gap $2d$ and surfaces which are bright or polished and therefore have a small radiation coefficient, so that in the case of an accident, heating occurs but in no event does a weakening of the sleeve $2c$ which is slipped on result. In addition, a thermally poorly conducting layer of insulation $6c$, which may be for example, asbestos, can be attached in the space $6b$ to retard heat as illustrated. The outer surface of the sleeve $2c$ is preferably coated with what is referred to as thermal paint. The temperature rise of the sleeve will be sufficient to indicate the fault location through a change of color of the thermal paint. In order to reduce the pressure increase in the spaces $2b$ and $6b$, cutouts $6f$ are provided in the temperature controlling member $6d$, in order to achieve pressure equalization between the two gas spaces separated by the insulating member 3. In order to prevent combustion products of the arc from flowing along unimpeded, the breakthroughs $6f$ are covered up by the control electrode $3b$.

The above described measures become more effective, the more temperature sensitive the material of the housing is, since in the embodiment according to the invention as shown in FIG. 4, the design for accidental-arc resistance is reduced to checking the effect of pressure increases of short duration without appreciable temperature rise. For a relatively large housing volume, e.g., for tubular lines, the margin of safety chosen for continuous pressure design is then only partially used up.

Figure 5:
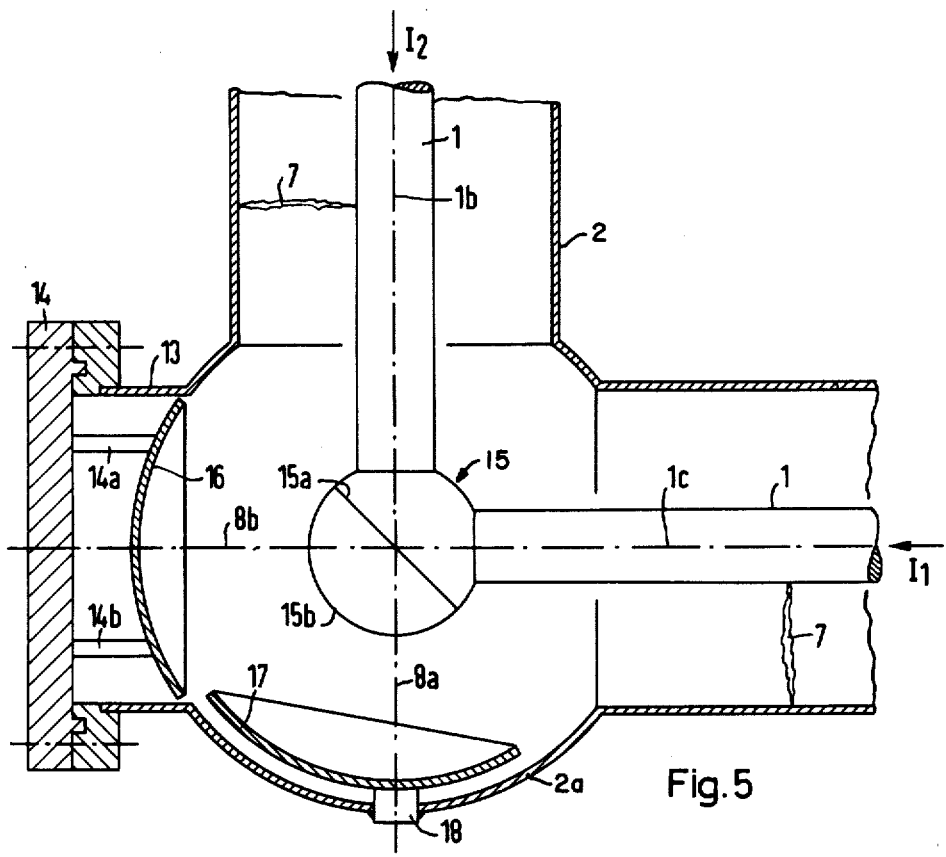
FIG. 5 is a similar cross-sectional view of a tubular conductor having a 90° change in direction.

FIG. 5 shows a cross sectional view illustrating the details of an arrangement such as that generally described in connection with FIG. 3. At the bend, the housing 2 is constructed as a spherical housing 2a. This housing 2a has an access cover 14, fastened to a tubular section 13 of the spherical housing. The conductors 1 terminate at the bend in a shielding sphere 15. The interior of the housing 2 is again filled with a gas such as $SF_6$ with the housing 2 and the conductor 1 made of aluminum as before.

An accidental arc can enter into the spherical housing 2a in such a manner that it travels completely through it without appreciable dwelling time, leaving only moderately heated burn tracks along with causing an increase in pressure. However, as described above in connection with FIG. 3, it is also possible that the accidental arc 7 can remain standing in the region between the dwelling points 8a and 8b, which coincide with the conductor axes 1b and 1c extended beyond their intersection, since the magnetic fields of the conductors 1 are weak at this point. In order to reduce the burn-off at the shielding sphere 15, the shielding sphere is divided in the example of the illustrated embodiment along a plane 15a with the portion of the sheilding sphere 15b not penetrated by the conductors made of a highly burn-off resistant material such as steel. Means must be provided at the plane 15a to ensure sufficient current transition to the conductors 1. The access cover 14 of the housing housing 2a is arranged opposite the high-current input $I_1$ and supports through spacers 14a and 14b, a spherical temperature protection shield 16 of highly burn-off resistant material which is part of the protective layer 12 described in connection with FIG. 3 and by which the housing 2 is reinforced at this point. The temperature protection shield is continued toward the second input having lower current at an elongated protective shield 17 fitted to the shape of the sphere 2and inserted into the encapsulation housing 2a and supported by a spacer 18. The highly burn-off resistant material of both temperature protection shields 16 and 17 can, for example, be of steel in the manner described above. Through these temperature protection shields 16 and 17 the same safety effect is achieved as that described in connection with FIG. 4.

Figure 6:
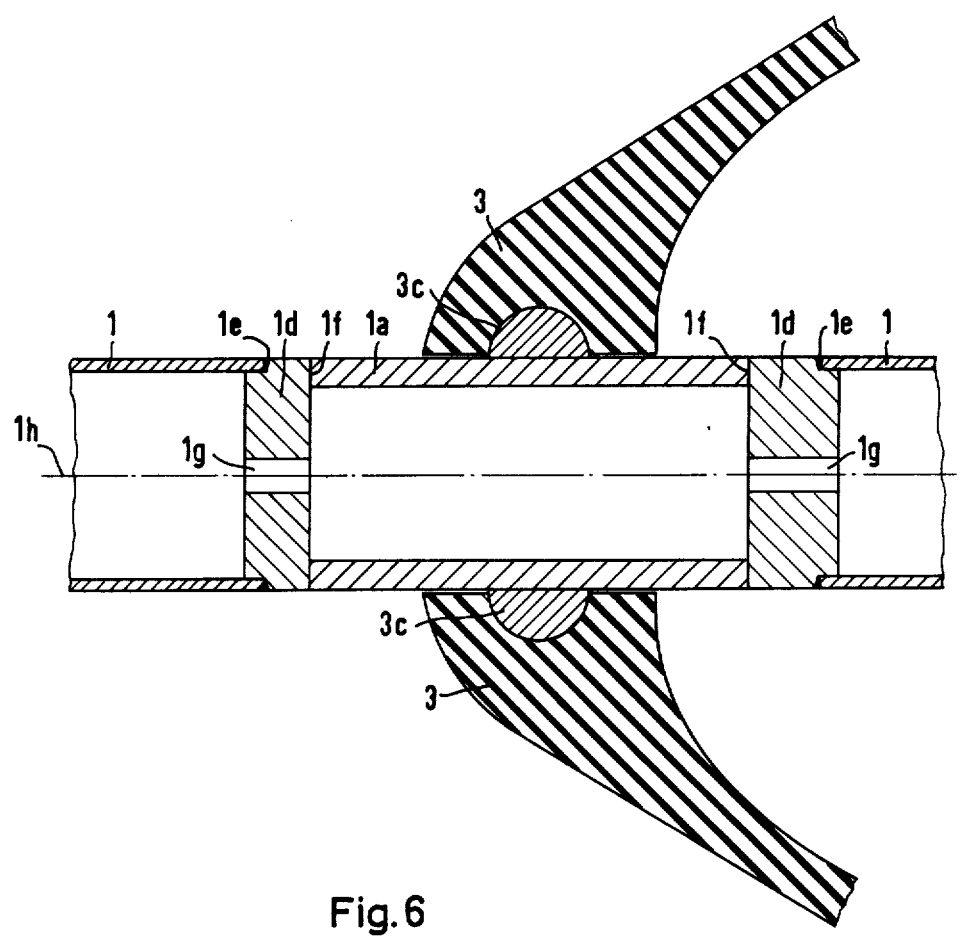
FIG. 6 is a cross-sectional view illustrating the voltage carrying part and a portion of the insulating member.

FIG. 6 illustrates a section of a voltage carrying part 1 of an enclosed gas insulated high voltage apparatus for example, a section of tubular line or a switching station. In this figure, the outer wall of the housing is omitted with only a portion of the insulating member 3 being shown. As described above, the insulating member 3 supports the conductor 1 within the housing. In the vicinity of the support insulator 3, a reinforcement of the inner conductor is provided through the use of more burn-off resistant material 1a. The normal portions of the inner conductor 1 consist essentially of an aluminum tube which is shown here in cross section. In this embodiment, copper 1a is chosen as the material for the more burn-off resistant intermediate piece. However, intermediate pieces of steel may also be interposed instead of copper. The insulating member 3 is braced on this intermediate piece 1a of copper using a grading electrode 3c. The entire arrangement has rotational symmetry with respect to the axis 1h.

With this arrangement of FIG. 6, the copper piece 1a has firmly secured to its end 1f, aluminum discs 1d at least one of which is provided with a hole 1g for manufacturing purposes. The intermediate piece of copper 1a jointed to the aluminum discs 1d is supplied to the installation site as a structural unit, the copper aluminum bonding having been accomplished by friction welding, in a shop which is equipped for such. At installation it is then only necessary to make a welded aluminum — aluminum joint 1e, which poses no special technical problem.

It should further be noted that in a multi-phase housing and with single pole accidental arcs, basically the same conditions would apply as in single pole housings. However, accidental single pole arcs very quickly become multipole arcs, as has been shown by experience since the propagation properties of the arcs are in principle the same, particularly with regard to straight sections of line, and therefore the same measures are useful for controlling the thermal arc effects in multi-phase installations as in single-pole housings and thus, a description of a multi-phase housing has not been provided herein.

In summary it can be stated that high operational safety is achieved by simple means using the apparatus according to the present invention. In particular, the possibility of pressure and temperature relief of the housing having a double-wall design should again be stressed. It is in this that the advantages of the present invention are particularly outstanding.

Thus, an improved embodiment of a high voltage apparatus providing these advantages has been shown. Although specific embodiments have been illustrated and described, it will be obvious to those skilled in the art that various modifications may be made without departing from the spirit of the invention which is intended to be limited solely by the appended claims.

What is claimed is:

1. In high voltage apparatus including a voltage carrying part which is enclosed by a housing and supported within the housing by insulating members and wherein gas under pressure is contained within the housing as insulation and which further includes an inner reinforcement member forming a double wall along with the outer housing wall with a space being formed therebetween to prevent burn-off in the case of an accidental standing arc, the improvement comprising said inner reinforcement member forming a double wall in the area of each of said insulating members, said inner reinforcement member including means for relieving the pressure to which said double wall portion is subjected in the case of an accidental standing arc burning near an insulating member and including means for retarding the heat generated thereby from being transmitted to the wall of said housing in amounts sufficient to cause damage.

2. High voltage apparatus according to claim 1 wherein the space between said housing and the reinforcement member is in communication with the interior of the remainder of said housing.

3. High voltage apparatus according to claim 2 wherein said means for retarding heat includes solid heat insulating material at least partially filling the space between the reinforcement member and said housing.

4. High voltage apparatus according to claim 2 wherein said means for relieving pressure include cutouts in said reinforcement member connecting the space between said housing and said reinforcement member with a gas space which is separated from the gas space in which an accidental arc will normally burn in case of trouble.

5. High voltage apparatus according to claim 4 wherein the outer wall of said housing comprises, at the double wall portion, a sleeve which is slipped over portions of the housing adjacent thereto.

6. High voltage apparatus according to claim 5 wherein said sleeve is covered on the outside with a paint which permanently changes color in response to a temperature rise.

7. High voltage apparatus according to claim 1 wherein said inner reinforcement member is of a material which is more burn-off resistent than said normal outer housing and wherein the housing is made of aluminum and the reinforcement member of steel.

8. High voltage apparatus according to claim 7 in which a reinforcement part against burn-off for the voltage carrying part is provided in the region exposed to an accidental standing arc and wherein said reinforcement part comprises a protective layer of a material having a greater burn-off resistance than the material of the voltage carrying part.

9. High voltage apparatus according to claim 8 wherein said protective layer is self supporting and at least partially at a distance to the voltage carrying part.

10. High voltage apparatus according to claim 8 wherein said reinforcement part is made of steel and said voltage carrying part of aluminum.

11. High voltage apparatus according to claim 1 and further including a reinforcement part against burn-off for the voltage carrying part in the region exposed to an accidental standing arc, said reinforcement part comprising at least in part a material whose burn-off resistance is greater than the burn-off resistance of the rest of the material for the voltage carrying part.

12. High voltage apparatus according to claim 11 wherein said reinforcement part is made of steel and said voltage carrying part of aluminum.

13. High voltage apparatus according to claim 11 wherein said reinforcement part is made of copper and said voltage carrying part of aluminum.

14. High voltage apparatus according to claim 13 wherein said copper reinforcement part is made in the form of a tube and further including an aluminum disc secured at both its ends.

15. High voltage apparatus according to claim 14 wherein the joint between the copper tube and the aluminum disc is a friction welded joint.

* * * * *

UNITED STATES PATENT AND TRADEMARK OFFICE
CERTIFICATE OF CORRECTION

PATENT NO. : 3,931,451
DATED : January 6, 1976
INVENTOR(S) : Rolf Dürschner et al It is certified that error appears in the above-identified patent and that said Letters Patent are hereby corrected as shown below:

Column 1, line 48, after the word "accidental" add --arc--

Column 5, line 1, change "ullustrated" to --illustrated--

Column 7, line 43, change "sphere 2 and" to --sphere 2a and--

Signed and Sealed this eleventh Day of May 1976

[SEAL]

Attest:

RUTH C. MASON
Attesting Officer

C. MARSHALL DANN
Commissioner of Patents and Trademarks